(12) United States Patent
Kim

(10) Patent No.: US 7,698,330 B2
(45) Date of Patent: Apr. 13, 2010

(54) SEARCH SYSTEM FOR PROVIDING INFORMATION OF KEYWORD INPUT FREQUENCY BY CATEGORY AND METHOD THEREOF

(75) Inventor: Dong Hoi Kim, Seoul (KR)

(73) Assignee: NHN Corporation, Seongnam-si (KR)

( * ) Notice: Subject to any disclaimer, the term of this patent is extended or adjusted under 35 U.S.C. 154(b) by 430 days.

(21) Appl. No.: 11/486,194

(22) Filed: Jul. 12, 2006

(65) Prior Publication Data

US 2007/0050355 A1    Mar. 1, 2007

Related U.S. Application Data

(63) Continuation of application No. PCT/KR2005/000121, filed on Jan. 14, 2005.

(30) Foreign Application Priority Data

Jan. 14, 2004   (KR) ..................... 10-2004-0002696

(51) Int. Cl.
   *G06F 17/30* (2006.01)
(52) U.S. Cl. ..................................... 707/727
(58) Field of Classification Search ............ 707/3–7
   See application file for complete search history.

(56) References Cited

U.S. PATENT DOCUMENTS

| | | | |
|---|---|---|---|
| 6,366,910 B1 * | 4/2002 | Rajaraman et al. ............. 707/5 |
| 6,463,428 B1 * | 10/2002 | Lee et al. ....................... 707/3 |
| 6,466,918 B1 * | 10/2002 | Spiegel et al. ................. 705/27 |
| 6,654,749 B1 * | 11/2003 | Nashed ......................... 707/10 |
| 6,697,799 B1 | 2/2004 | Neal et al. |
| 6,704,729 B1 * | 3/2004 | Klein et al. ..................... 707/5 |
| 6,785,671 B1 * | 8/2004 | Bailey et al. ................... 707/3 |
| 6,795,825 B2 | 9/2004 | Rishe |
| 6,978,264 B2 * | 12/2005 | Chandrasekar et al. ......... 707/3 |
| 7,051,023 B2 * | 5/2006 | Kapur et al. .................... 707/5 |
| 7,146,416 B1 * | 12/2006 | Yoo et al. ..................... 709/224 |
| 7,152,064 B2 | 12/2006 | Bourdoncle et al. |
| 7,305,415 B2 | 12/2007 | Vernau et al. |
| 7,395,259 B2 * | 7/2008 | Bailey et al. .................... 707/3 |
| 7,401,072 B2 | 7/2008 | Piscitello et al. |
| 7,447,678 B2 * | 11/2008 | Taylor et al. .................... 707/3 |
| 2001/0042064 A1 | 11/2001 | Davis |
| 2002/0174110 A1 | 11/2002 | Smith |
| 2003/0004781 A1 | 1/2003 | Mallon et al. |
| 2003/0014403 A1 | 1/2003 | Chandrasekar et al. |
| 2003/0055816 A1 | 3/2003 | Paine et al. |
| 2003/0061219 A1 | 3/2003 | Monteverde |
| 2003/0088553 A1 * | 5/2003 | Monteverde .................... 707/3 |

(Continued)

FOREIGN PATENT DOCUMENTS

KR   10-2000-0006814 A   2/2000

(Continued)

*Primary Examiner*—Tim T. Vo
*Assistant Examiner*—Michelle Owyang
(74) *Attorney, Agent, or Firm*—H.C. Park & Associates, PLC

(57) ABSTRACT

The present disclosure relates to a search service system and a method thereof, and more particularly, relates to a search service system capable of providing an input ranking of a keyword which is input into the search service system, according to a category to which the keyword belongs, and a method thereof.

24 Claims, 8 Drawing Sheets

U.S. PATENT DOCUMENTS

2003/0195901 A1 10/2003 Shin et al.
2004/0078214 A1* 4/2004 Speiser et al. .................. 705/1
2005/0055344 A1* 3/2005 Liu et al. ....................... 707/3
2005/0080773 A1 4/2005 Koike et al.
2007/0130139 A1 6/2007 Kim et al.

FOREIGN PATENT DOCUMENTS

| KR | 10-2000-0036454 A | 7/2000 |
| KR | 2002-0003915 | 1/2002 |
| KR | 10-2002-0025142 A | 4/2002 |

* cited by examiner

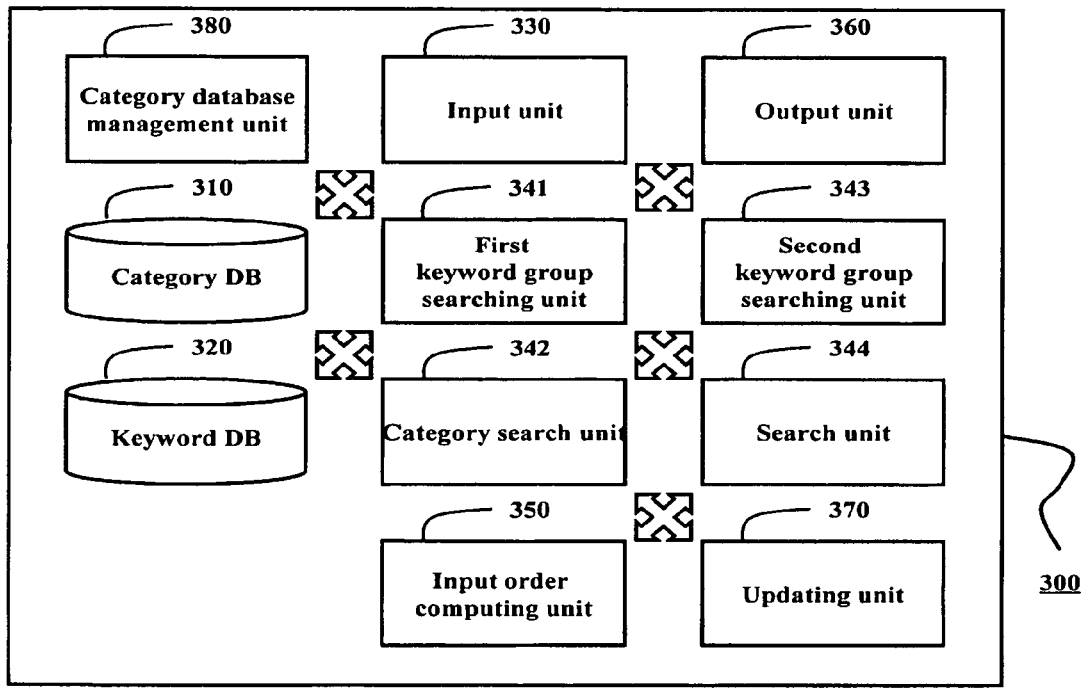

FIG. 5

| Categories | Keyword group identifiers |
|---|---|
| Singers | Rain; Leehyori; Boa; Changnara; Seven; ... ; ... |
| Movies | Island; The lord of the ring; ...; ... |
| Dramas | Road to the heaven; Great cook; Destiny;...;... |
| Category 4 | Keyword group identifier 1; keyword group identifier 2; ...; ... |
| Category 5 | Keyword group identifier 4; keyword group identifier 5; keyword group identifier 6; ...; ... |
| ... | ... |

FIG. 6

| Keyword group | | Data of the number of input keywords |
|---|---|---|
| Representative keywords | Same/similar keywords | |
| Rain (Korean) | | 321    601 |
| Seven (Korean) | seven | 234 |
| Boa (Korean) | boa | 256 |
| Changnara (Korean) | | 115 |
| Leehyori (Korean) | Hyori (Korean) | 358 |
| ... | ... | ... |

SEARCH SYSTEM FOR PROVIDING INFORMATION OF KEYWORD INPUT FREQUENCY BY CATEGORY AND METHOD THEREOF

CROSS-REFERENCE TO RELATED APPLICATIONS

This application is a continuation of International Patent Application No. PCT/KR2005/000121, filed on Jan. 14, 2005, which claims priority to Korean Patent Application No. 10-2004-0002696, filed on Jan. 14, 2004, each of which is incorporated herein by reference.

BACKGROUND OF THE INVENTION

1. Field of the Invention

The present disclosure relates to a search service system and a method thereof, and more particularly, relates to a search service system capable of providing an input order of a keyword which is input into the search service system, according to a category to which the keyword belongs, and a method thereof.

2. Description of the Related Art

The most general search service method provided by a search service system is a keyword search service. In case that a keyword is input from a user, the search service system, which provides the keyword search service, provides the user with search results including the keyword (e.g., a web site including the keyword, an article including the keyword, an image with a file name including the keyword, etc).

At this time, the search service system according to the prior art further provides a service of notifying a user of 'a popular search word'. A drawing symbol 101 of FIG. 1 illustrates one example of popular search words provided for the user, in the search service system according to the prior art.

However, the service of providing popular search words according to the prior art is configured to display several popular search words whose frequency ranks high, on a web page or the like, by using the number of keywords input by users per certain period. Thus, there is a problem that it is impossible to provide users with popular search words in real time.

Furthermore, the service of providing popular search words according to the prior art is configured to determine and provide popular search words by using only the number of input keywords, without classifying keywords by categories. Thus, there is a problem that no matter what kind of keyword a user inputs, the user has no choice but to be provided with the same popular keywords such as a singer (Kyoo-chan Cho), a drama (Lady Han), a movie (Ocean's twelve) and the like, as illustrated in FIG. 1.

Furthermore, the service of providing popular search words according to the prior art neither computes how popular each search word is, nor provides the computed results. Thus, there is a limit that users cannot know which popular search word among popular search words is more popular.

Furthermore, in the service of providing popular search words according to the prior art, in case that the keyword input by a user is not a popular search word, there is a problem that the user cannot know how much interest other users have in an issue related to the keyword input by oneself.

SUMMARY OF THE INVENTION

The present disclosure is conceived to solve the aforementioned problems in the prior art, and one object of the present disclosure is to provide search service system and method which can provide input orders, or input rankings, of keywords, by categories of keywords input in the search service system.

Furthermore, other object of the present disclosure is to provide search service system and method which can further provide other keywords belonging to a category related to a keyword input in the search service system, and an input ranking of each of the keywords.

Furthermore, another object of the present disclosure is to provide search service system and method which can include keywords having similar or same meaning in one group of keywords, and in case that an input keyword is included in the keyword group, compute and provide an input ranking of keyword compatible with a user's intention by increasing the number of input keywords related to the keyword group.

Furthermore, another object of the present disclosure is to provide search service system and method which can compute and provide an input ranking of keyword in a selected category according to the latest issue of users who input the keyword, by enabling at least one keyword (or a keyword group) related to a category to be maintained and a keyword (or a keyword group) related to the category to be changeable.

One embodiment comprises a search service system. The search service system comprises: a category database including a category and at least one keyword group identifier associated therewith, wherein the keyword group identifier is for identifying a predetermined keyword group and the keyword group includes a representative keyword, or a similar keyword having the same or similar meaning thereto; a keyword database including data of the number of input keywords corresponding to a keyword group; an input unit for receiving a keyword from a user through a communication network; a first keyword group searching unit for searching for a first keyword group including the received keyword by referring to the keyword database; a category search unit for searching for a first category associated with the first keyword group by referring to the category database; a second keyword group searching unit for searching for a second keyword group associated with the first category by referring to the category database; a search unit for searching for data of the number of input keywords corresponding to the second keyword group by referring to the keyword database; an input ranking computing unit for computing an input ranking of the first keyword group within the first category by using the searched data of the number of input keywords; an output unit for providing the user with the computed input ranking through the communication network, in association with the first category and a representative category included in the first keyword group; and an updating unit for updating data of the number of input keywords corresponding to the first keyword group, thereby recording the same in the keyword database.

The search service system according to one aspect of the present disclosure comprises a category database management unit for: receiving a selection of a category, a selection of a keyword group and a request for deletion, from a manager; and deleting a keyword group identifier with respect to the selected keyword group from at least one keyword group identifier associated with the selected category, in the category database.

Furthermore, the search service system according to another aspect of the present disclosure further comprises a category database management unit for: receiving a selection of a category, a selection of a keyword group and a request for an addition, from a manager; and adding a keyword group identifier with respect to the selected keyword group in association with the selected category, thereby recording the same in the category database.

Furthermore, according to another aspect of the present disclosure, the input ranking computing unit respectively computes a second input ranking of the second keyword group within the first category, based on the second keyword group and data of the number of input keywords corresponding thereto; and the output unit provides the user with the second input ranking through the communication network, in association with the first category and a representative keyword included in the second keyword group.

Furthermore, according to another aspect of the present disclosure, the output unit selects the predetermined number of second keyword groups of which the second input rankings rank high; and provides the user with a second input ranking corresponding to the selected second keyword group through the communication network, in association with the first category and a representative keyword included in the selected second keyword group.

BRIEF DESCRIPTION OF THE DRAWINGS

FIG. 3 is an internal block diagram illustrating configuration of a search service system according to one embodiment of the present disclosure.

FIG. 4 is a drawing illustrating one example of data maintained in a category database, in one embodiment of the present disclosure.

FIG. 5 is a drawing illustrating one example of data maintained in the category database after the keyword group identifier 'seven (Korean)' related to the 'movie' category is deleted from the category database illustrated in FIG. 4 by a category database management unit.

FIG. 6 is a drawing illustrating one example of predetermined keyword groups and data of the number of input keywords corresponding thereto.

DETAILED DESCRIPTION OF THE PREFERRED EMBODIMENT

Hereinafter, the present disclosure will be in detail described with reference to the accompanying drawings.

Figure 1:
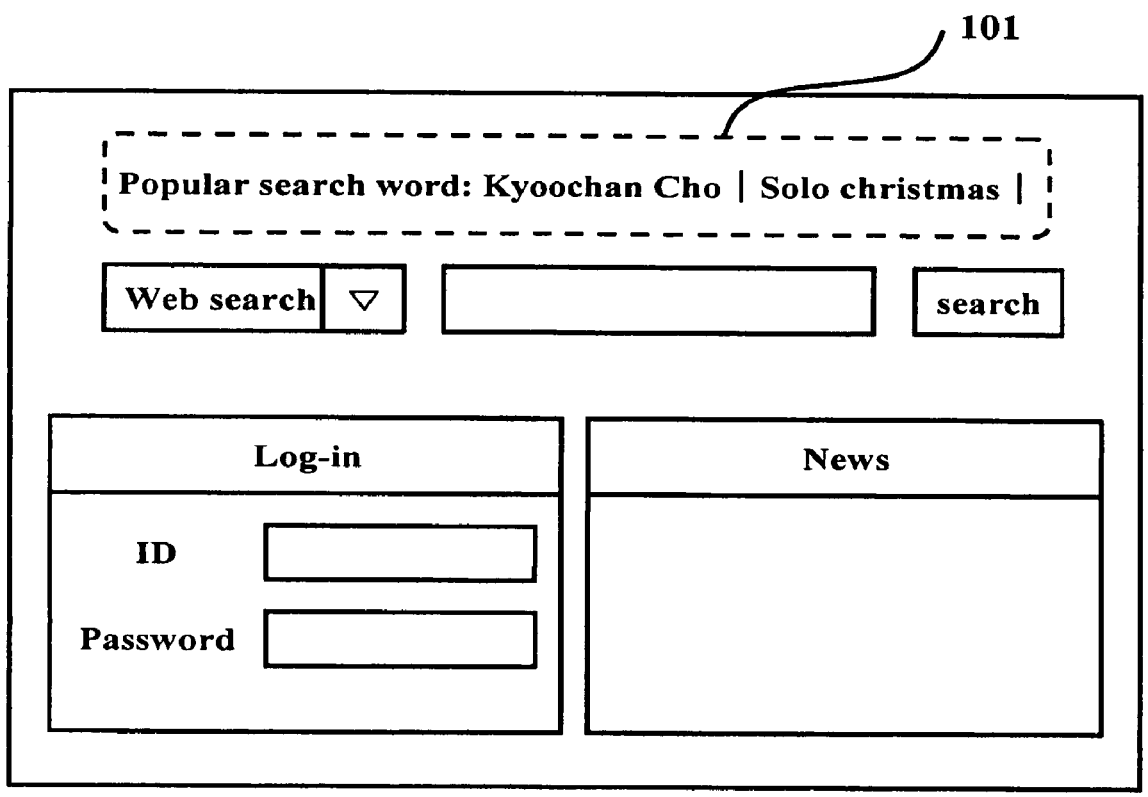
FIG. 1 is a drawing illustrating one example of popular search words provided for a user by a search service system according to the prior art.
Figure 2:
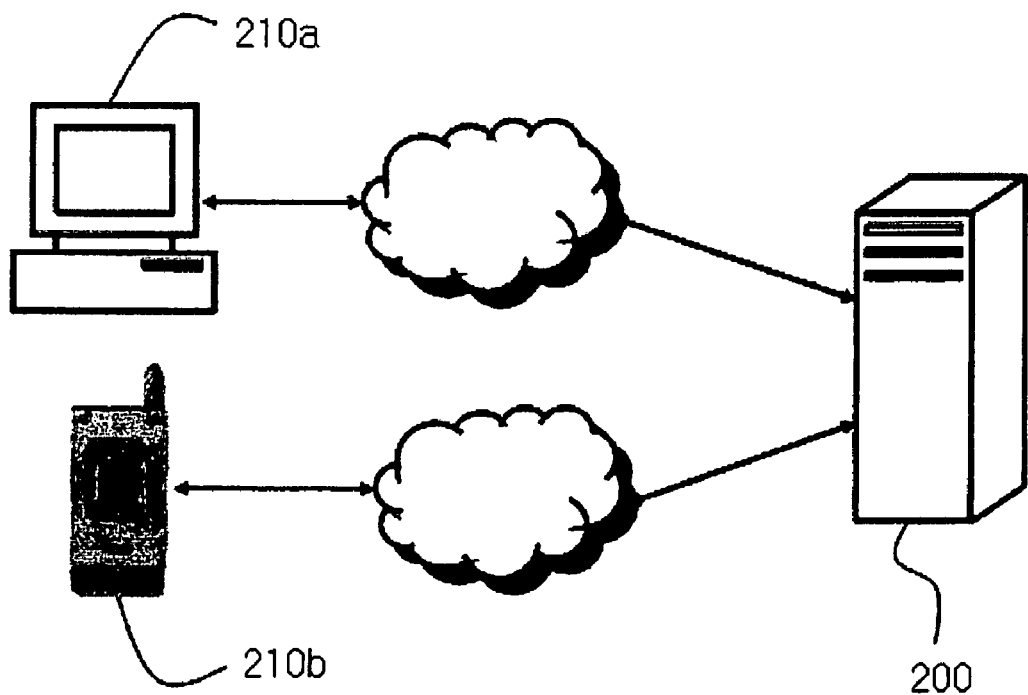
FIG. 2 is a drawing illustrating a network connection of a search service system according to one embodiment of the present disclosure.

FIG. 2 is a drawing illustrating a network connection of a search service system according to one embodiment of the present disclosure. Users get access to a search service system 200 through a wired/wireless communication network by using a user terminal 210a or 210b, and input a keyword. The search service system 200 transmits a keyword search result corresponding to the keyword, to the user terminal 210a or 210b. Moreover, the search service system 200 according to the present disclosure further transmits an input ranking of the input keyword by category, to the user terminal 210a or 210b.

FIG. 3 is an internal block diagram illustrating configuration of the search service system 200 according to one embodiment of the present disclosure. A search service system 300 comprises a category database 310, a keyword database 320, an input unit 330, a first keyword group searching unit 341, a category search unit 342, a second keyword searching unit 343, a search unit 344, an input ranking computing unit 350, an output unit 360, an updating unit 370 and a category database management unit 380.

In the meantime, the term of "a keyword group" used in the present specification means a group comprising one representative keyword and a keyword having the same/similar meaning thereto, wherein the term of "the representative keyword" means a keyword provided for a user from keywords comprised in the keyword group, together with an input ranking.

Furthermore, the term of "a first keyword group" used in the present specification means a keyword group including a keyword input from a user, among keyword groups. The term of "a second keyword group" means a keyword group whose category is same to that of the first keyword group, among keyword groups. Therefore, the second keyword group includes the first keyword group.

In addition, the term of "a second input ranking" used in the present specification means an input ranking of the second keyword group within the category.

The category database 310 includes a category and at least one keyword group identifier associated therewith. FIG. 4 is a drawing illustrating one example of data recorded in the category database 310.

The keyword group identifier is for identifying a predetermined keyword group and as illustrated in FIG. 4, the present embodiment adopts a representative keyword of the keyword group as the keyword group identifier for general understanding. Moreover, generally there exists a plurality of keyword group identifiers associated with one category.

According to one embodiment of the present disclosure, the search service system 300 includes the category database management unit 380 for managing the category database 310. In case that a selection of a category, a selection of a keyword group and a request for deletion is received from a manager, the category database management unit 380 deletes a keyword group identifier with respect to the selected keyword group from at least one keyword group identifier associated with the selected category, in the category database 310.

In addition, in case that a selection of a category, a selection of a keyword group and a request for an addition is received from a manager, the category database management unit 380 adds a keyword group identifier with respect to the selected keyword group in association with the selected category, thereby recording the same in the category database 310.

According to the configuration like above, the search service system 300 is enabled to compute an input ranking in correspondence with a user's intention. For example, in association with a keyword 'seven', users used to input the keyword into the search service system 300 in order to search for the movie 'seven'. However, in case that it is determined that users input the keyword 'seven' in order to search for the singer 'seven', not the movie titled by 'seven', the manager inputs a selection of a keyword group including the category 'movie' and the keyword 'seven' in the category database management unit 380, and asks for a deletion. At this time, in case that a keyword group identifier of the keyword group including the keyword 'seven' is also 'seven', the category database management unit 380 deletes the keyword group identifier 'seven' associated with the 'movie' category from the category database 310, as illustrated in FIG. 4.

FIG. 5 is a drawing illustrating one example in which the keyword group identifier 'seven' is deleted from keyword group identifiers in the category database, as aforementioned.

In the same manner, in case that users request a search for a new keyword in association with a predetermined category, for example, in case that users input the drama titled 'great cook' as a keyword with the drama on T.V, the category database management unit 380 adds a keyword group identifier with respect to a keyword group including 'great cook' in association with the category 'drama', thereby recording the same in the category database 310.

Like above, the manger continuously manages the category database 310 by using the category database management unit 380. Thus, although users input the keyword 'seven' to search for the singer 'seven', the manager may prevent the unexpected movie 'seven' of the movie category from ranking high in input rankings of keywords.

Therefore, the keyword 'seven' to search for the singer 'seven' is currently input, however, the social issue changes, for example, into the drama 'seven' and users' interests thereon go up, and it is determined that users input the keyword 'seven' to search for the drama 'seven'. In this case, the category database management unit 380 deletes a keyword group identifier with respect to a keyword group including 'seven' from keyword group identifiers associated with the category 'singer' in the category database 310 according to the manager's command, and adds the keyword group identifier in association with the category 'drama', thereby storing the same in the category database 310. Thus, the category database management unit 310 enables an input ranking of a keyword corresponding to a user's intention to be computed.

The keyword database 320 maintains data of the number of input keywords corresponding to a keyword group, as illustrated in FIG. 6. The keyword group includes a representative keyword and at least one keyword having the same/similar meaning thereto. For example, as indicated by a drawing symbol 601, the representative keyword is 'seven (Korean)', the keyword having the same/similar meaning to 'seven (Korean)' is 'seven', and 'seven (Korean)' and 'seven' are included in one keyword group.

The search service system 300 according to the present embodiment is intended to compute an input ranking of a keyword corresponding to a user's intention by using a concept of a keyword group including at least one keyword. For example, in case that users want to search for the singer 'seven', they often input 'seven (in Korean)' or 'seven' as a keyword. At this time, the keyword 'seven (Korean)' and 'seven' are used for the same target. Therefore, in case that an input ranking is computed based on the number of inputs corresponding to each of keywords 'seven (Korean)' and 'seven', unlike users' intention, there may be an event that their interests with respect to the singer 'seven' might be depreciated. For example, in case that the input number of keyword 'leehyori' is 300, that of keyword 'seven (Korean)' is 280 and that of keyword 'seven' is 50, the total number of input keywords with respect to the signer 'seven' is "280 (seven (Korean))+50 (seven)=330". However, since an input ranking with respect to the keyword 'leehyori' is computed higher, there is a concern that an input ranking not corresponding to a user's intention, might be computed, such that users might think that people are more interested in the singer 'leehyori' rather than the singer 'seven'. Therefore, in case that the keyword 'seven (Korean)' is input and in case that the keyword 'seven' is input, in order to compute the number of inputs by adding up the two cases, the search service system according to the present disclosure is configured to comprise a representative keyword (seven (Korean)) and a keyword (seven) having the same/similar meaning thereto, as one keyword group.

The input unit 330 receives a keyword from the user terminal 210a or 210b, through the communication network. For example, the received keyword is 'seven'.

The first keyword group searching unit 341 searches for a first keyword group including the received keyword, by referring to the keyword database 320. Referring to FIG. 6, the first keyword group including the received keyword 'seven' is a keyword group whose representative keyword is 'seven (Korean)'.

The category search unit 342 searches for a first category associated with the first keyword group, by referring to the category database 310. Referring to FIG. 5, the first category is the category 'singer'.

The second keyword group searching unit 343 searches for a second keyword group associated with the first category, by referring to the category database 310. Referring to FIG. 5, the second groups associated with the first category are keyword groups whose keyword group identifiers are 'rain (Korean)', 'leehyori (Korean)', 'boa (Korean)', 'changnara (Korean)', 'seven (Korean)' and the like.

The search unit 344 searches for data of the number of input keywords corresponding to the second keyword groups, by referring to the keyword database 320. Referring to FIG. 6, data of the number of input keywords corresponding to the second keyword groups are respectively 321 for the second keyword group 'rain', 358 for the second keyword group 'leehyori', 256 for the second keyword group 'boa', 115 for the second keyword group 'changnara', 234 for the second keyword group 'seven', . . . .

The input ranking computing unit 350 computes an input ranking of the first keyword group within the first category, by using the searched data of the number of input keywords. In case that it is assumed that there are searched only five keyword groups of which keyword group identifiers are respectively 'rain (Korean)', 'leehyori (Korean)', 'boa (Korean)', 'changnara (Korean)', and 'seven (Korean)', the sizes of the searched data of the number of input keywords are in order of the second keyword group 'leehyori', the second keyword group 'rain', the second keyword group 'boa', the second keyword group 'seven' and the second keyword group 'changnara'. Therefore, an input ranking of the first keyword group 'seven' is 4th.

As aforementioned, the search service system 300 according to the present embodiment determines a category to which a keyword group including a keyword input by a user belongs, and computes an input ranking of a first keyword group among second keyword groups belonging to the category. Therefore, the input ranking may be computed according to a category.

Figure 7:
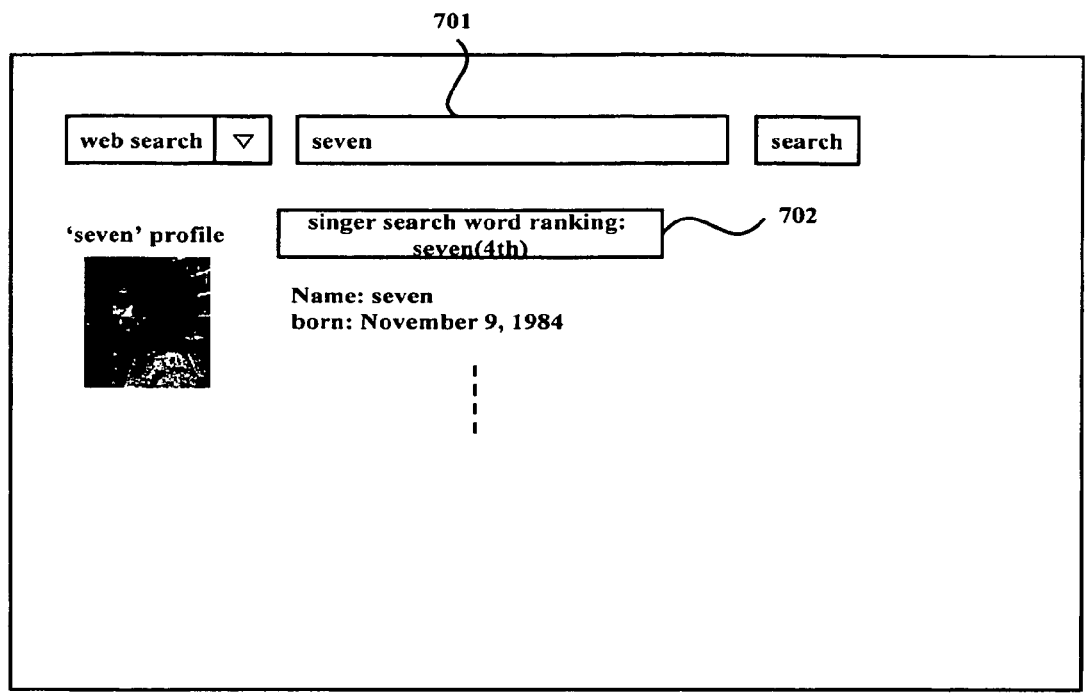
FIGS. 7 to 10 are drawings illustrating examples of input rankings provided for a user terminal by a search service system according to each embodiment of the present disclosure.

The output unit 360 provides the user terminal 210a or 210b with the computed input ranking, in association with the first category 'singer' and the representative keyword 'seven (Korean)' of the first keyword group. FIG. 7 is a drawing illustrating one example of an input ranking provided for the user terminal 210a or 210b, according to the configuration like above. As indicated by a drawing symbol 701 in FIG. 7, in case that a user inputs 'seven' in the search service system 300, the search service system 300, with respect to the keyword 'seven', further provides an input ranking in association with the representative category 'singer' and the representative keyword 'seven (Korean)' of the first keyword group, as indicated by a drawing symbol 702, together with keyword search results. In the meantime, according to the present embodiment, the input ranking is provided with search results. Therefore, the user may be provided with an input ranking associated with the keyword in real time.

In addition, according to another embodiment of the present disclosure, the input ranking computing unit 350 respectively computes second input rankings of second keyword groups, based on the second keyword groups and data of the number of input keywords corresponding thereto. In the present embodiment, second input rankings are respectively computed in such a way that the second keyword group 'lee-hyori' is 1st, the second keyword group 'rain' is 2nd, the second keyword group 'boa' is 3rd, the second keyword group 'seven (Korean)' (the keyword group 'seven (Korean)' is also a first keyword group) is 4th and the second keyword group 'changnara' is 5th.

Figure 8:
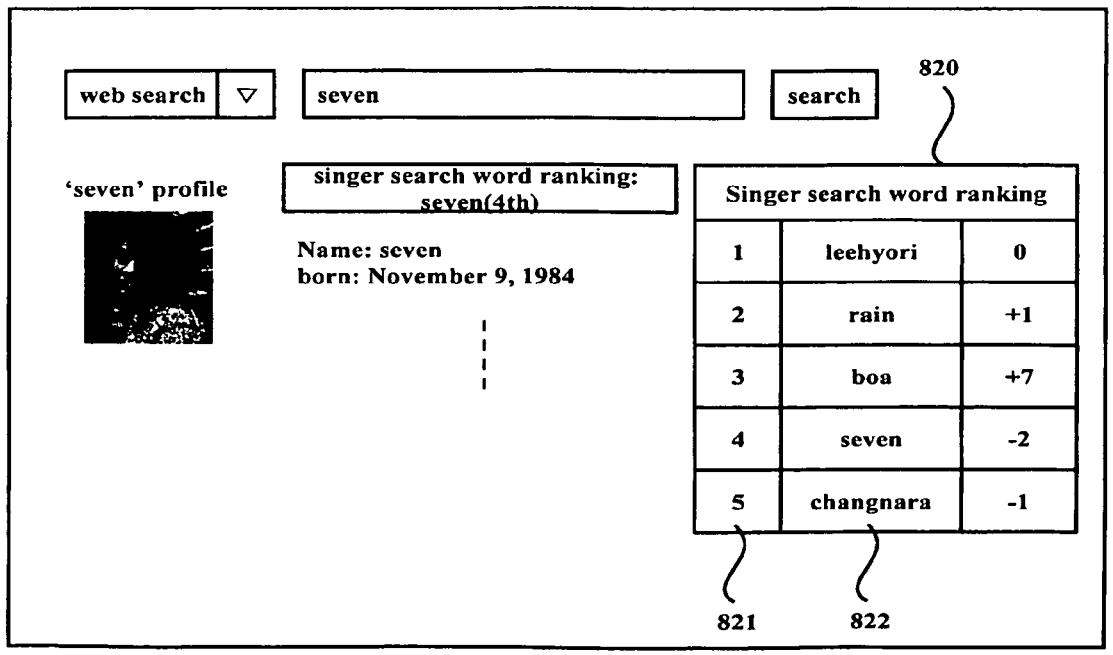

The output unit 360 provides the user terminal 210a or 210b with the second input ranking, in association with the first category 'singer' and a representative keyword of the second keyword group. FIG. 8 is a drawing illustrating one example of the second input ranking provided for the user terminal 210a or 210b according to the present embodiment. According to the present embodiment, in case that the keyword 'seven' input by a user belongs to the category 'singer', input rankings of other keyword groups belonging to the category 'singer' are also provided as indicated by drawing symbol 820. A drawing symbol 821 means each second input ranking and a drawing symbol 822 means a representative keyword of each second keyword group.

In addition, according to another embodiment of the present disclosure, the output unit 360 selects the predetermined number of second keyword groups whose second input rankings rank high, and provides a user with only second input ranking related to the selected second keyword group. In the aforementioned embodiment, there is described that second keyword groups are only five. However, generally, there exists a plurality of second keyword groups related to one representative category. At this time, in case that all the input rankings related to second keyword groups are provided for a user, too much information is unnecessarily provided, which might offend the user. Accordingly, the search service system 300 according to the present embodiment provides the predetermined number of second keyword groups whose second input rankings rank high, from second keyword groups related to a representative category. For example, the search service system 300 selects 10 groups of second keyword groups whose input rankings are within top ten, and provides the second input rankings thereof.

Figure 9:

FIG. 9 is a drawing illustrating one example of providing second input rankings of second keyword groups whose second input rankings are within top ten, in case that there are a plurality of second keyword groups related to the representative category. Like the aforementioned embodiment, the second input ranking may be provided in association with the first category and the representative keyword of the second keyword.

Figure 10:

In the meantime, in case that an input ranking of the first keyword group is out of top ten among the second input rankings, the search service system 300 provides the user with second input rankings of second keyword groups to top ten, separately from the input ranking of the first keyword group. FIG. 10 is a drawing illustrating one example of input rankings provided for the user terminal 210a or 210b, in case that an input ranking of a first keyword group is out of top ten. Namely, in case that the input ranking of the first keyword group related to the keyword 'seven' input by a user ranks 53rd among second keyword groups related to the first category 'singer', the input ranking related to the first keyword group and second input rankings of second keyword groups which are within top ten among the second keyword groups are respectively provided for the user.

The updating unit 370 updates data of the number of input keywords related to the first keyword group of the keyword database 320, in response to input of the keyword 'seven'. Namely, the updating unit 370 updates '234', data of the number of input keywords related to the first keyword group including the keyword 'seven', to '235'. Based on setting of the search service system 300, the updating unit 370 may update data of the number of input keywords before or after computing the input ranking.

Furthermore, according to another embodiment of the present disclosure, the search service system 300 provides input rankings by period with respect to keywords. The keyword database 320 maintains data of the number of input keywords by period corresponding to a predetermined keyword group. The updating unit 370 updates the data of the number of input keywords by period, to 0 periodically. The cycle may be a period set by a manager.

Like above, since the updating unit 370 updates data of the number of input keywords to 0, according to the period, the input rankings computed by the input ranking computing unit 350 are ones by period. According to the present embodiment, the user provided with input rankings by period can know the latest main issue in a field related to the first category.

Furthermore, according to another embodiment of the present disclosure, the keyword database 320 may maintain both the whole data of the number of input keywords and data of the number of input keywords by period. At this time, the input ranking computing unit 350 may compute the whole input rankings and input rankings by period by respectively using the whole data of the number of input keywords and the data of the number of input keywords by period. The output unit 380 may provide a user with the computed whole input rankings and input rankings by period.

Furthermore, according to another embodiment of the present disclosure, the search service system 300 further provides information on a fluctuation band of input ranking. The search service system 300 according to the present embodiment further comprises a storage unit, an input ranking searching unit, an input ranking band computing unit and an input ranking updating unit.

The storage unit stores an input ranking of a keyword group related to a predetermined category. The input ranking stored in the storage unit is an input ranking computed by the input ranking computing unit 350, according to input of a keyword just before the user inputs the keyword.

The input ranking searching unit searches the storage unit for an input ranking of a keyword group which corresponds to the second keyword group and is related to the representative category. The input ranking band computing unit computes a fluctuation band of input rankings of the second keyword group, by comparing the searched input ranking with the second input ranking of the second keyword group in the first category. For example, in case that the input ranking of the keyword group 'changnara', which is stored in the storage unit in association with the category 'singer', ranks 1st, and the second input ranking, which is newly computed in such a way that a user inputs the keyword 'changnara', ranks 2nd, the input ranking-band computing unit computes '−1', the fluctuation band.

The output unit 360 provides the computed fluctuation band for the user terminal 210a or 210b in association with the second input ranking, as indicated by a drawing symbol 923 in FIG. 9. The input ranking updating unit updates an input ranking of a keyword group that corresponds to the second keyword group and is related to the first category 'singer', to the second input ranking in the storage unit. At this time, this is used as data for computing a fluctuation of a second input ranking which is newly computed by input of a new keyword. Among the fluctuation band indicated by a drawing symbol 923 in FIG. 9, in comparison with the last time, '+1' is used to show that the input ranking is up by one place, '−1' is used to show that the input ranking is down by one place, and '0' is used to show that the input ranking has no change.

Based on the configuration like above, according to the present embodiment, a user can know an input ranking of one's input keyword in a predetermined (first) category and input rankings of other keywords belonging to the (first) category. Together with this, the user can know whether of change in the input ranking/the fluctuation band thereof. Therefore, the user can know ordinary people's interests and any change thereof.

Figure 11:
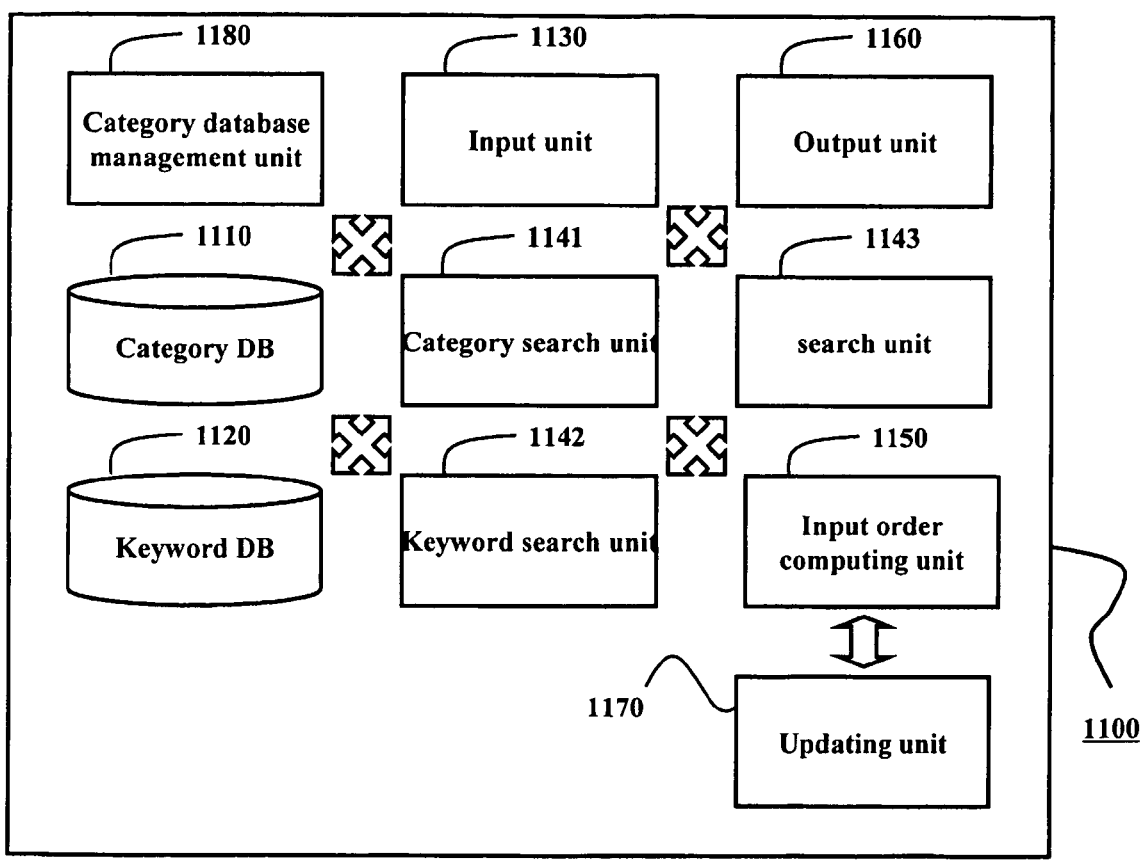
FIG. 11 is a block diagram illustrating a search service system according to another embodiment of the present disclosure.

Hereinafter, a search service system according to another embodiment of the present disclosure will be described with reference to FIG. 11. A search service system 1100 according to the present embodiment comprises a category database 1100, a keyword database 1120, an input unit 1130, a category search unit 1141, a keyword search unit 1142, a search unit 1143, an input ranking computing unit 1150, an output unit 1160 and an updating unit 1170.

The category database 1110 includes a category and at least one keyword associated therewith.

The keyword database 1120 includes data of the number of input keywords corresponding to a keyword.

The input unit 1130 receives a first keyword from a user through a communication network, and the category search unit 1141 searches for a first category associated with the first keyword by referring to the category database 1110.

The keyword search unit 1141 searches for a second keyword associated with the first category by referring to the category database 1110. The search unit 1143 searches for data of the number of input keywords corresponding to the second keyword by referring to the keyword database 1120.

The input ranking computing unit 1150 computes an input ranking of the first keyword within the first category by using the searched data of the number of input keywords, and the output unit 1160 provides the user with the computed input ranking, in association with the first category and the first keyword, through the communication network.

Furthermore, according to another embodiment of the present disclosure, the input ranking computing unit 1150 may compute an input ranking of the second keyword within the first category by using the searched data of the number of input keywords, and the output unit 1160 may further provide the user with the input ranking of the second keyword together with the input ranking of the first keyword. Moreover, the input ranking of the second keyword may be provided only with respect to the predetermined number of second keywords of which input rankings rank high.

The updating unit 1160 updates data of the number of input keywords corresponding to the first keyword, thereby records the same in the keyword database 1120.

According to the present embodiment, in a category to which a keyword input by a user belongs, it may be possible to provide the user with an input ranking of the keyword or input rankings of keywords belonging to the category. Since the search service system 1100 according to the present embodiment does not adopt a concept of a keyword group, with respect to the keyword 'seven (Korean)' and the keyword 'seven', data of the number of input keywords are respectively maintained and input rankings thereof are also respectively computed. Otherwise, in case that data only with respect to the keyword 'seven (Korean) is maintained in the keyword database 1120 and data with respect to the keyword 'seven' is not maintained therein, the input ranking with respect to the keyword 'seven' is not computed. Accordingly, in case that an input ranking is computed according to the present embodiment and provided for a user, a keyword most adopted by users (i.e. the keyword 'seven (Korean) rather than the keyword 'seven') is used to indicate the same target.

Figure 12:
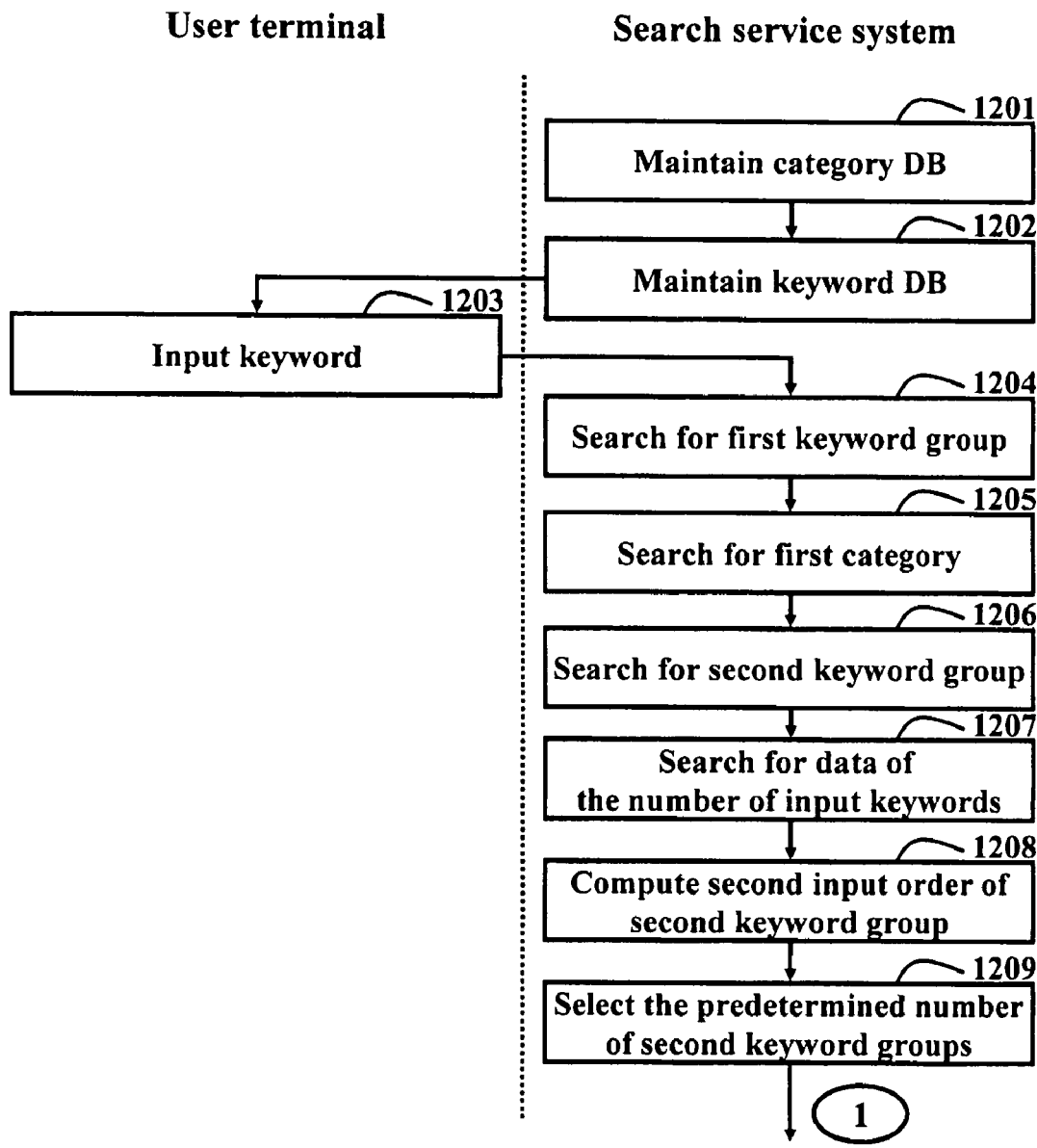
FIGS. 12 and 13 are flowcharts illustrating a search service method according to another embodiment of the present disclosure.
Figure 13:
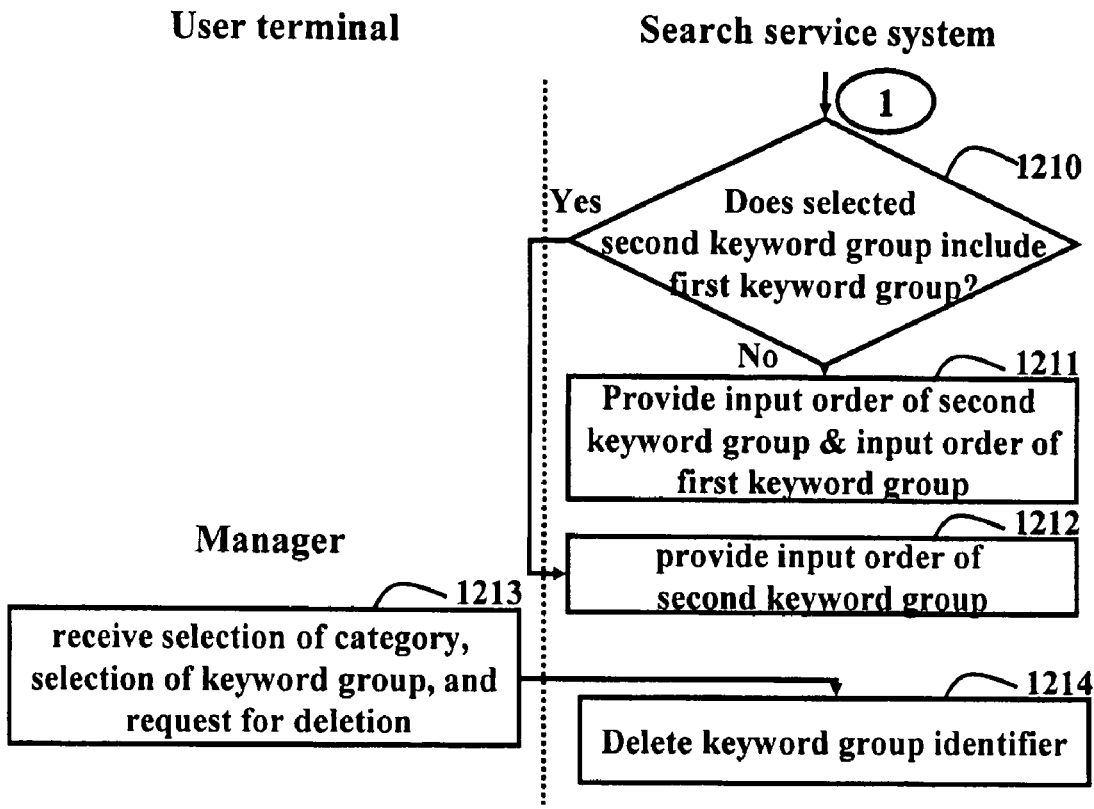

Hereinafter, the method for providing a search service according to another embodiment of the present disclosure will be described. FIGS. 12 and 13 are flowcharts illustrating the search service method according to the present embodiment. The search service method according to the present embodiment may be implemented by the search service system 200 as illustrated in FIG. 2.

In the step 1201, the search service system 200 maintains a category database including a category and at least one keyword identifier associated therewith. The keyword group identifier is for identifying a predetermined keyword group and a representative keyword of the keyword group may be used.

In the step 1202, the search service system 200 maintains a keyword database including data of the number of input keywords corresponding to a keyword group. The keyword group includes a representative keyword or a keyword having the same/similar meaning thereto. For example, the search service system 200 includes 'mcthemax (Korean)' and 'M.C The Max' in the same keyword group, and enables one keyword group to be formed by setting 'mcthemax (Korean)' as a representative keyword.

In the step 1203, the search service system 200 receives a keyword from the user terminal 210a or 210b. At this time, in case that 'mc the max (Korean)' is received, there may be adopted variety of algorithms such as algorithm enabling 'mc the max (Korean)' to be regarded as same to 'mcthemax (Korean)' by deleting space words therebetween.

The search service system 200 searches for a second keyword group associated with the first category by referring to the category database in the step 1206, and searches for data of the number of input keywords corresponding to the second keyword group by referring to the keyword database.

Therefore, a keyword group belonging to a category associated with the keyword that is input by the user and data of the number of input keywords corresponding to the keyword group are searched.

In the step 1208, the search service system 200 respectively computes input rankings of second keyword groups by using data of the number of input keywords thereof. Since at least one second keyword group includes the first keyword group, according to definition of terms used in the present specification, an input ranking of the first keyword group is also automatically computed in the step 1208.

In the step 1209, the search service system 200 selects the predetermined number of second keyword groups based on the input ranking. For example, the search service system 200 selects only second keyword groups whose input rankings are within top ten.

In case that the selected second keyword group includes the first keyword group, i.e. in case that the input ranking of the first keyword group is within top ten, the search service system 200 provides the second input ranking for the user terminal 210a or 210b, in association with the first category and a representative keyword included in the second keyword group, in the step 1212. A user is provided with input rankings by category as illustrated in FIG. 9, by configuration like above.

In the meantime, in case that the selected second keyword group does not include the first keyword group, i.e. in case that an input ranking of the first keyword group is out of top ten, the search service system 200 provides the user terminal 210a or 210b with the second input ranking of the selected second keyword group and the input ranking of the first keyword respectively, in the step 1211. The input ranking of the first keyword group is provided in association with the first category and a representative keyword included in the first keyword group, and the second input ranking is provided in association with the first category and a representative keyword included in the second keyword group. A user is provided with input rankings by category, as illustrated in FIG. 10, by configuration like above.

According to another embodiment of the present disclosure, the search service system 200 may provide a user with only input ranking corresponding to a first keyword group, in association with a first category. In addition, according to another embodiment of the present disclosure, the search service system 200 may provide only input ranking related to the second keyword group whose input ranking is within the predetermined number. At this time, in case that the first keyword group is not included in the second keyword group, an input ranking related to the first keyword group is not provided.

The search service system 200 receives a selection of a category, a selection of a keyword group, and a request for deletion in the step 1213, and deletes a keyword group identifier with respect to the selected keyword group from at least one keyword group identifier associated with the selected category, in the category database in the step 1214.

In the meantime, in case that a request for an addition, not a request for deletion, is received from the manager in the step 1213, the search service system 200 adds a keyword group identifier with respect to the selected keyword group in association with the selected category, thereby recording the same in the category database in the step 1214.

By performing the steps 1213 and 1214, the search service system 200 may appropriately change a category to which a predetermined keyword belongs in correspondence with change in users' interests. Accordingly, an input ranking of a keyword in a category of a field for a user's intention may be computed.

Furthermore, according to another embodiment of the present disclosure, an input ranking by category may be computed in association with a keyword, by maintaining data of the number of input keywords by keywords, without adopting a concept of a keyword group.

The embodiments of the present disclosure include computer readable media including program instructions to implement various operations embodied by a computer. The media may also include, alone or in combination with the program instructions, data files, data structures, tables, and the like. The media and program instructions may be those specially designed and constructed for the purposes of the present disclosure, or they may be of the kind well known and available to those having skill in the computer software arts.

Figure 14:
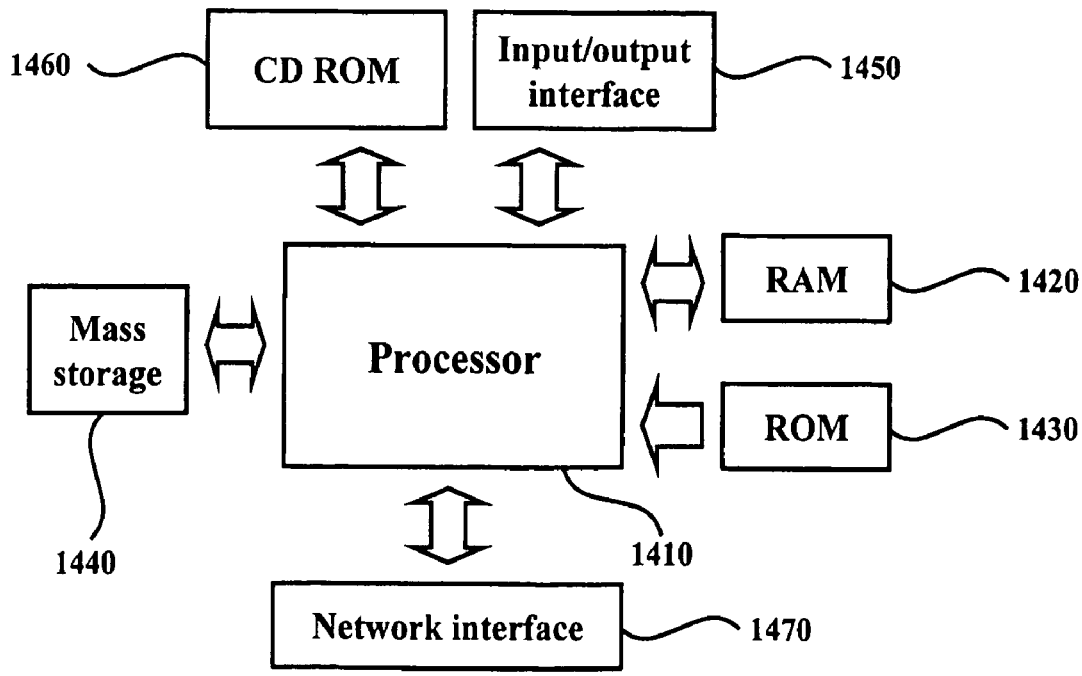
FIG. 14 is an internal block diagram of a genera-purpose computer which may be adopted in implementing a search service method according to the present disclosure.

FIG. 14 is an internal block diagram of a general-purpose computer which can be more adopted in implementing the search service method according to the present disclosure.

The computer system 1400 includes any number of processors 1410 (also referred to as central processing units, or CPUs) that are coupled to storage devices including primary storage (typically a random access memory, or "RAM 1420"), primary storage (typically a read only memory, or "ROM 1430"). As is well known in the art, ROM 1430 acts to transfer data and instructions uni-directionally to the CPU, and RAM 1420 is used typically to transfer data and instructions in a bi-directional manner. Both of these primary storage devices may include any suitable type of the computer-readable media described above. A mass storage device 1440 is also coupled bi-directionally to CPU and provides additional data storage capacity and may include any of the computer-readable media described above. The mass storage device 1440 may be used to store programs, data and the like and is typically a secondary storage medium such as a hard disk that is slower than primary storage. A specific mass storage device such as a CD-ROM 1460 may also pass data uni-directionally to the CPU. Processor 1410 is also coupled to an interface 1450 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 1410 optionally may be coupled to a computer or telecommunications network using a network connection as shown generally at network interface 1470. With such a network connection, it is contemplated that the CPU might receive information from the network, or might output information to the network in the course of performing the above-described method steps. The above-described devices and materials will be familiar to those of skill in the computer hardware and software arts.

The hardware elements above may be configured to act as one or more software modules for implementing the operations of this invention.

The foregoing descriptions of specific embodiments of the present disclosure have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended thereto and their equivalents.

Although the present disclosure has been described in connection with the embodiment of the present disclosure illustrated in the accompanying drawings, it is not limited thereto since it will be apparent to those skilled in the art that various substitutions, modifications and changes may be made thereto without departing from the scope and spirit of the invention.

According to the present disclosure, there is provided search service system and method which can provide a user with an input ranking of a keyword, by category of the keyword input into the search service system. The input ranking of the keyword by category may be provided for the user in real time, together with search results with respect to the keyword.

Furthermore, according to the present disclosure, there is provided search service system and method which can further provide other keywords belonging to a category related to a keyword input in the search service system, and an input ranking of each of the keywords.

Furthermore, according to the present disclosure, there is provided search service system and method which can include keywords having similar or same meaning in one group of keywords, and in case that an input keyword is included in the keyword group, compute and provide an input ranking of keyword compatible with a user's intention by increasing the number of input keywords related to the keyword group.

Furthermore, according to the present disclosure, there is provided search service system and method which can compute and provide an input ranking of keyword in a selected category according to the latest issue of users who input the keyword, by enabling at least one keyword (or a keyword group) related to a category to be maintained and a keyword (or a keyword group) related to the category to be changeable.

What is claimed is:

1. An electronic search system comprising:
   computer readable storage media that stores search-related information, including:
      a plurality of categories, including at least one category comprising:
         a plurality of keyword groups, wherein at least one group of keywords includes a keyword group identifier for identifying the at least one group of keywords and for distinguishing the at least one group of keywords from another group of keywords within the at least one category;
      a keyword database including at least:
         keyword input data indicating a number of times a keyword is input into the system within a period of time; and
         keyword group input data indicating a number of times user input has been received with respect to the at least one keyword group,
         wherein a given keyword group from among the at least one keyword group includes at least one keyword having the same or similar meaning as other keywords in the given keyword group, and the electronic search system is configured to compute the number of times user input has been received with respect to the given keyword group by adding up a total number of times user input has been received with respect to keywords in the given keyword group having the same or similar meaning; and
      an updating module configured to periodically reset the keyword input data;
   an input module configured to receive a keyword from a user;
   a searching module, including program instructions stored in the computer readable storage media, which, when executed is configured to search, using the keyword received from the user, the keyword database for a first group of keywords which is representative of a first category that includes the keyword received from the user, and for a second group of keywords, wherein the second group of keywords belongs to the first category, wherein the second keyword group includes at least one keyword that is not in the first keyword group, and wherein the first keyword group is associated with a first keyword group identifier, and wherein the keyword database includes keyword group input data associated with the first keyword group;
   a computing module, including program instructions stored in the computer readable storage media, which, when executed is configured to rank the first group of keywords within the first category in relation to one or more second keyword groups included in the first category using the keyword group input data associated with the first keyword group and using keyword group input data associated with the second keyword group; and
   an output module, including program instructions stored in the computer readable storage media, which, when executed is configured to provide the ranking of the first group within the first category for display to the user.

2. The system of claim 1, further comprising an updating module including executable program instructions stored in computer readable storage media, which, when executed is configured to update data in the keyword database to indicate changes in a number of times a keyword is input into the system.

3. The system of claim 1, wherein the at least one category is stored in a category database.

4. The system of claim 1, further comprising:
   a category database management module including executable program instructions stored in computer readable storage media, which, when executed is configured to delete a keyword group identifier from a category in response to a request for deletion of the keyword group identifier from the category.

5. The system of claim 1, further comprising:
   a category database management module including executable program instructions stored in computer readable storage media, which, when executed is configured to add a keyword group identifier from a category in response to a request for addition of the keyword group identifier from the category.

6. The system of claim 1, wherein the computing module is configured to provide a single ranking for both the first and the second group of keywords within their category using data from the keyword database.

7. The system of claim 6, wherein the output module is configured to provide the user with a ranking that includes a predetermined number of keywords from the second group of keywords in addition to a representative keyword from the first group of keywords.

8. The system of claim 6, the system further comprising:
   a storage module including executable program instructions stored in computer readable storage media, which, when executed is configured to store ranking information for a group of keywords in a category;
   a storage search module including executable program instructions stored in computer readable storage media, which, when executed is configured to search the storage module for a previously stored ranking of the group of keywords;
   a ranking-band module including executable program instructions stored in computer readable storage media, which, when executed is configured to compute a change in rankings of the group of keywords by comparing the previously stored ranking of the group of keywords with a current ranking of the group of keywords; and
   a ranking-updating module including executable program instructions stored in computer readable storage media configured to update the input ranking of the group of keywords in the storage module; and
   wherein the output module is further configured to provide the computed change in rankings of the group of keywords to the user.

9. A method for searching, the method comprising:
   maintaining in computer readable storage media information on at least one category, the at least one category comprising at least one group of keywords, wherein the at least one group of keywords includes a representative keyword, and wherein the at least one group of keywords includes a keyword group identifier for identifying the at least one group of keywords;

maintaining in the computer readable storage media a keyword database including at least:

keyword input data indicating a number of times a keyword is input into the system within a period of time; and keyword group input data indicating a number of times user input has been received with respect to a given keyword group, wherein the given keyword group includes at least one keyword having the same or similar meaning as other keywords in the given keyword group, and the number of times user input has been received with respect to a given keyword group is determined by adding up a total number of times user input has been received with respect keywords in the given keyword group having the same or similar meaning;

maintaining in the computer readable storage media an updating module configured to periodically reset the keyword input data;

receiving over a network at a computer based search system a keyword from a user;

searching using the computer based search system the keyword database for a first group of keywords which is representative of a first category that includes the keyword received from the user, and searching the keyword database for a second group of keywords, wherein the second group of keywords belongs to the first category and wherein the second group of keywords includes at least one keyword that is not in the first group of keywords;

ranking using the computer based search system the first group of keywords within the first category using keyword group input data associated with the at least one keyword group; and providing the ranking to the user via an output module, wherein the ranking is provided to the user via a terminal.

10. The method of claim 9, further comprising updating data in the keyword database to indicate changes in a number of times a keyword is input.

11. The method of claim 9, wherein category formation is maintained and stored in a category database, and wherein the category searching module searches the category database.

12. The method of claim 9, further comprising:
deleting a keyword group identifier from a category in response to a request for deletion of the keyword group identifier from the category.

13. The method of claim 9, further comprising:
adding a keyword group identifier from a category in response to a request for addition of the keyword group identifier from the category.

14. The method of claim 9, further comprising:
provides a single ranking for both the first and the second group of keywords within their category using data from the keyword database.

15. The method of claim 14, wherein providing the user with the single ranking further includes providing the user with a ranking that includes a predetermined number of keywords from the second group of keywords in addition to a representative keyword from the first group of keywords.

16. The method as defined in claim 9, the method further comprising:

determining whether the second group of keywords includes the first group of keywords, wherein the second group of keywords includes a plurality of keyword groups;

when the second group of keywords includes the first group of keywords, providing corresponding rankings of the plurality of groups in the second group to the user via the output module, wherein the ranking of the first group is consecutive with respect to the ranking of at least one other of the plurality of groups in the second group;

when the second group of keywords does not include the first group of keywords:

providing the ranking of the first group of keywords in association with the first category and a representative keyword included in the first group of keywords via the output module, and providing corresponding rankings of the plurality of groups in the second group to the user via the output module in association with the first category and a representative keyword included in the second group of keywords, where the plurality of groups in the second group are consecutively ranked, and the ranking of the first group is not consecutive with the ranking of any of the plurality of groups in the second group.

17. A computer-readable storage media storing instructions that when executed perform a method comprising:

maintaining information on at least one category, the at least one category comprising at least one group of keywords, wherein the at least one group of keywords includes a representative keyword, and wherein the at least one group of keywords includes a keyword group identifier for identifying the at least one group of keywords;

maintaining a keyword database including at least:

keyword input data indicating a number of times a keyword is input into the system within a period of time; and keyword group input data indicating a number of times user input has been received with respect to a given keyword group, wherein the given keyword group includes at least one keyword having the same or similar meaning as other keywords in the given keyword group, and the instructions are configured to compute the number of times user input has been received with respect to the given keyword group by adding up a total number of times user input has been received with respect keywords in the given keyword group having the same or similar meaning;

maintaining an updating module configured to periodically reset the keyword input data;

receiving a keyword from a user;

searching the keyword database for a first group of keywords which is representative of a first category that includes the keyword received from the user, and searching the keyword database for a second group of keywords using, an inputted criterion, wherein the second group of keywords belongs to the first category as the first group of keywords and includes at least one keyword that is not in the first group of keywords;

ranking the first group of keywords within the first category using keyword group input data associated with the at least one keyword group; and providing the ranking to the user.

18. The computer-readable storage media of claim 17, further comprising updating data in the keyword database to indicate changes in a number of times a keyword is input.

19. The computer-readable storage media of claim 17, wherein category information is maintained and stored in a category database, and wherein the category searching module searches the category database.

20. The computer-readable storage media of claim 17, further comprising:
deleting a keyword group identifier from a category in response to a request for deletion of the identifier from the category.

21. The computer-readable storage media of claim 17, further comprising:
adding a keyword group identifier from a category in response to a request for addition of the identifier from the category.

22. The computer-readable storage media of claim 17, further comprising:
provides a single ranking for both the first and the second group of keywords within their category using data from the keyword database.

23. The computer-readable storage media of claim 22, wherein providing the user with the single ranking further includes providing the user with a ranking that includes a predetermined number of keywords from the second group of keywords in addition to a representative keyword from the first group of keywords.

24. An electronic search system comprising:
means for maintaining information on at least one category, the at least one category comprising at least one group of keywords, wherein the at least one group of keywords includes a representative keyword, and wherein the at least one group of keywords includes a keyword group identifier for identifying the at least one group of keywords;
means for maintaining a keyword database the keyword database including at least:
 keyword input data indicating a number of times a keyword is input into the system within a period of time; and
 keyword group input data indicating a number of times user input has been received with respect to a keyword group,
 wherein a given keyword group in the at least one keyword group includes at least one keyword having the same or similar meaning as other keywords in the given keyword group, and the electronic search system is configured to compute the number of times user input has been received with respect to the given keyword group by adding up a total number of times user input has been received with respect keywords in the given keyword group having the same or similar meaning;
means to periodically reset the keyword input data;
means for receiving a keyword from a user;
means for searching the keyword database for a first group of keywords which is representative of a first category that includes the keyword received from the user, and means for searching the keyword database for a second group of keywords, wherein the second group of keywords belongs to the first category, wherein the means for searching the keyword database for a first group of keywords includes at least one processor unit, wherein the at least one processor unit is coupled to a storage device;
means for ranking the first group of keywords within the first category using keyword group input data associated with the at least one keyword group; and
means for providing the ranking to the user.

* * * * *